No. 890,301. PATENTED JUNE 9, 1908.
H. REISERT.
APPARATUS FOR PURIFYING WATER.
APPLICATION FILED MAY 12, 1906.
4 SHEETS—SHEET 1.
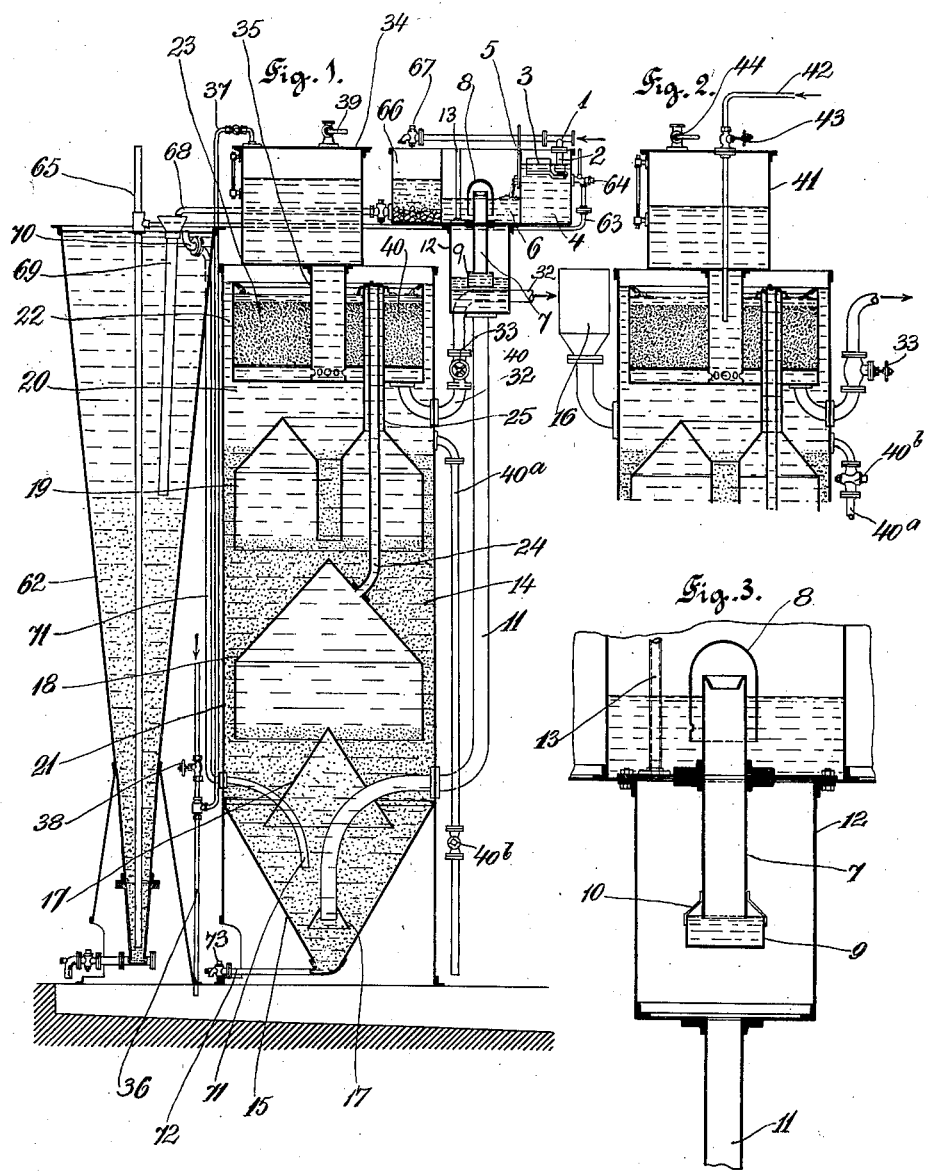
WITNESSES
John O. Gempler.
D. Harold Brush
INVENTOR
Hans Reisert
BY
Wm. F. Bissing
his ATTORNEY

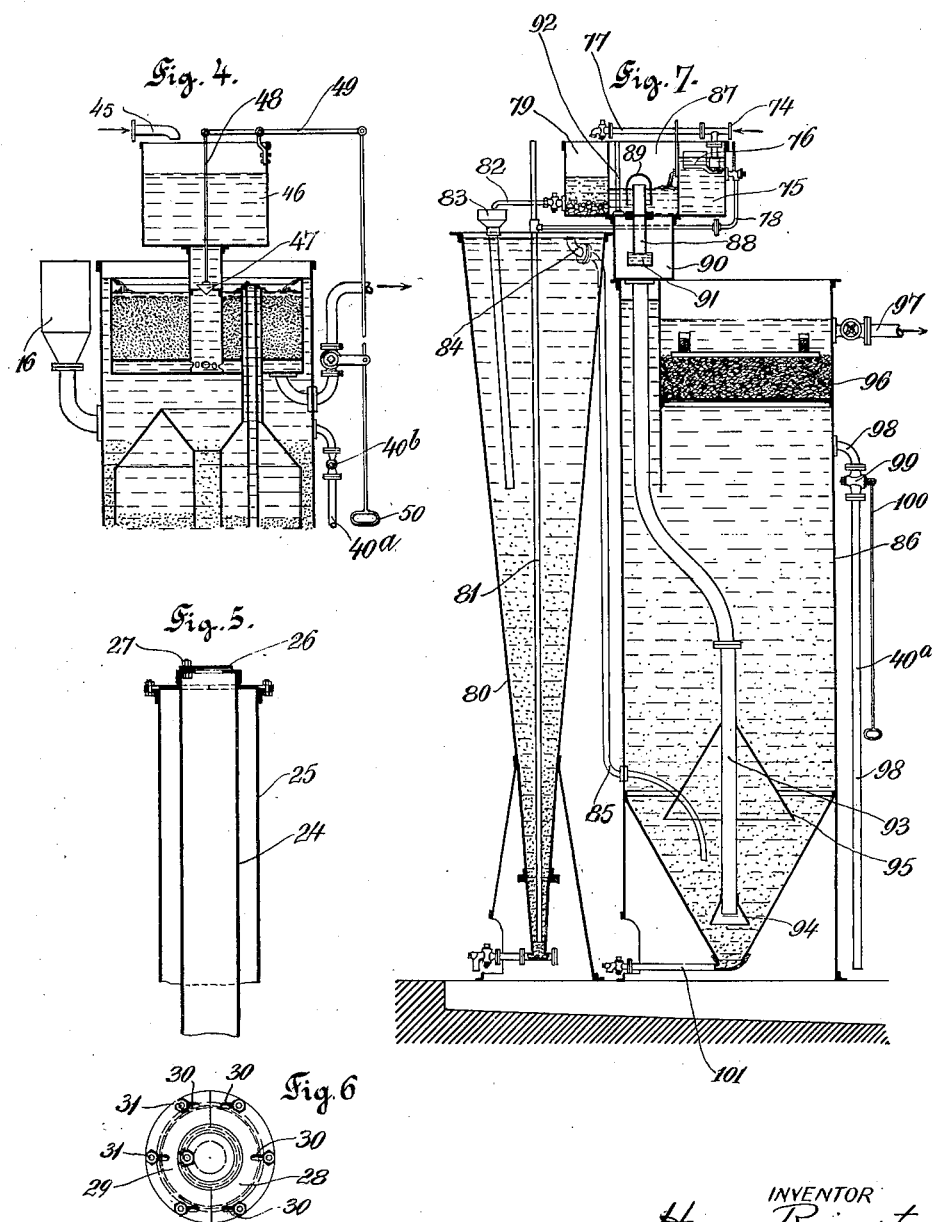

UNITED STATES PATENT OFFICE.

HANS REISERT, OF COLOGNE, GERMANY, ASSIGNOR TO HANS REISERT COMPANY, A CORPORATION OF GERMANY.

APPARATUS FOR PURIFYING WATER.

No. 890,301.     Specification of Letters Patent.     Patented June 9, 1908.

Application filed May 12, 1906. Serial No. 316,429.

*To all whom it may concern:*

Be it known that I, HANS REISERT, a citizen of the Empire of Germany, and a resident of Cologne, Germany, have invented certain new and useful Improvements in Apparatus for Purifying Water, of which the following is a specification.

My invention relates to an apparatus for purifying water and in particular to an apparatus by means of which water may be purified and filtered by use of a suitable reagent, such as baryta and in which the filter may be quickly and effectively washed out in a minimum amount of time.

One object of my invention is to provide an apparatus for purifying water in which a baryta bath is utilized, the bath being subdivided into a plurality of layers and a separate stream of water being supplied to each of said layers.

Another object of my invention is to regulate the discharge of one or more of the streams of water passing through the baryta layers, and to filter the discharged water.

Another object of my invention is to supply the water to be purified to the apparatus by means of a siphon, at the same time preventing the intake of air into the apparatus through the action of the siphon.

With the above and other objects in view, my invention consists in the improvements, parts and combinations more particularly set out in the claims.

Figure 8:
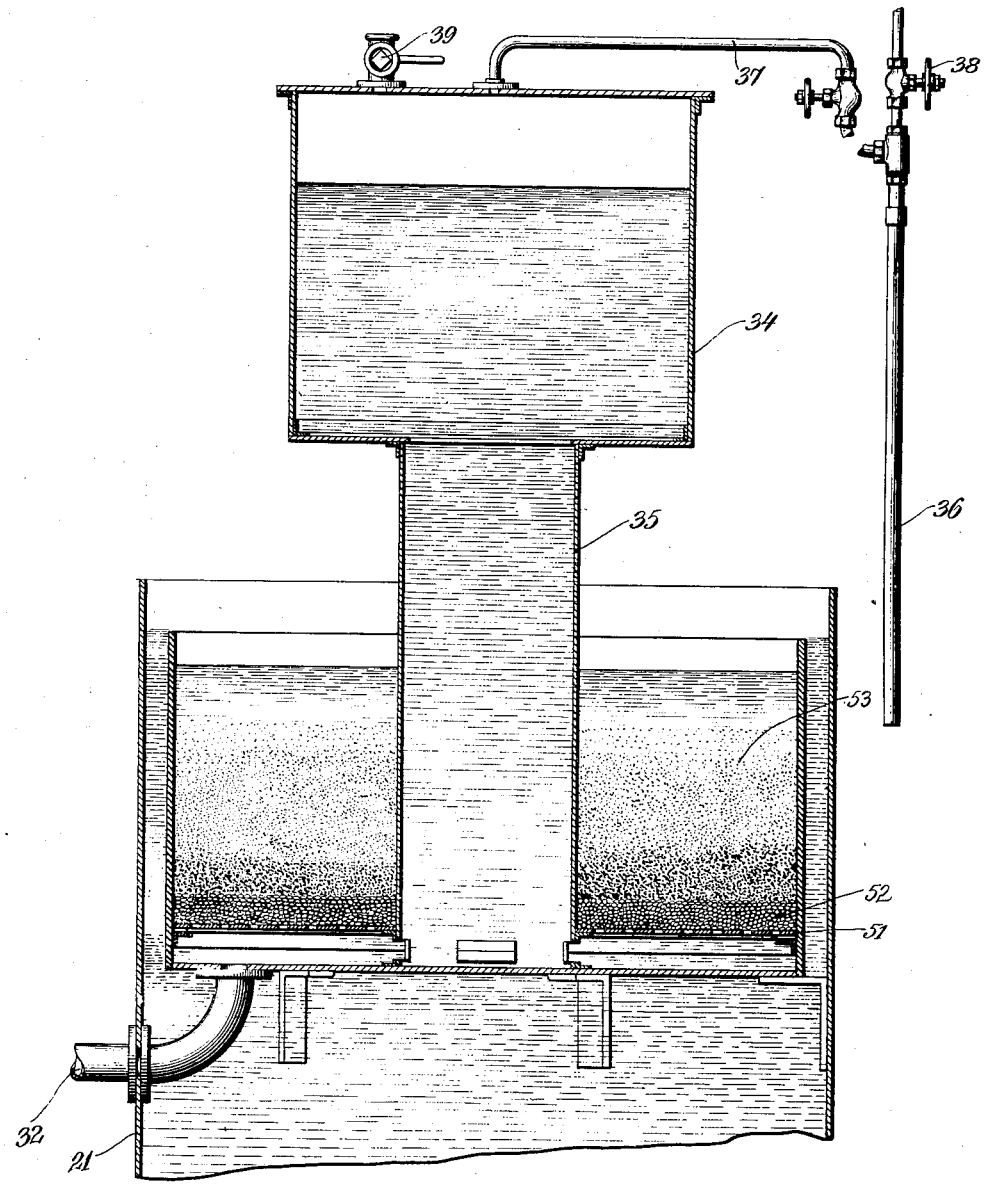
Figure 9:
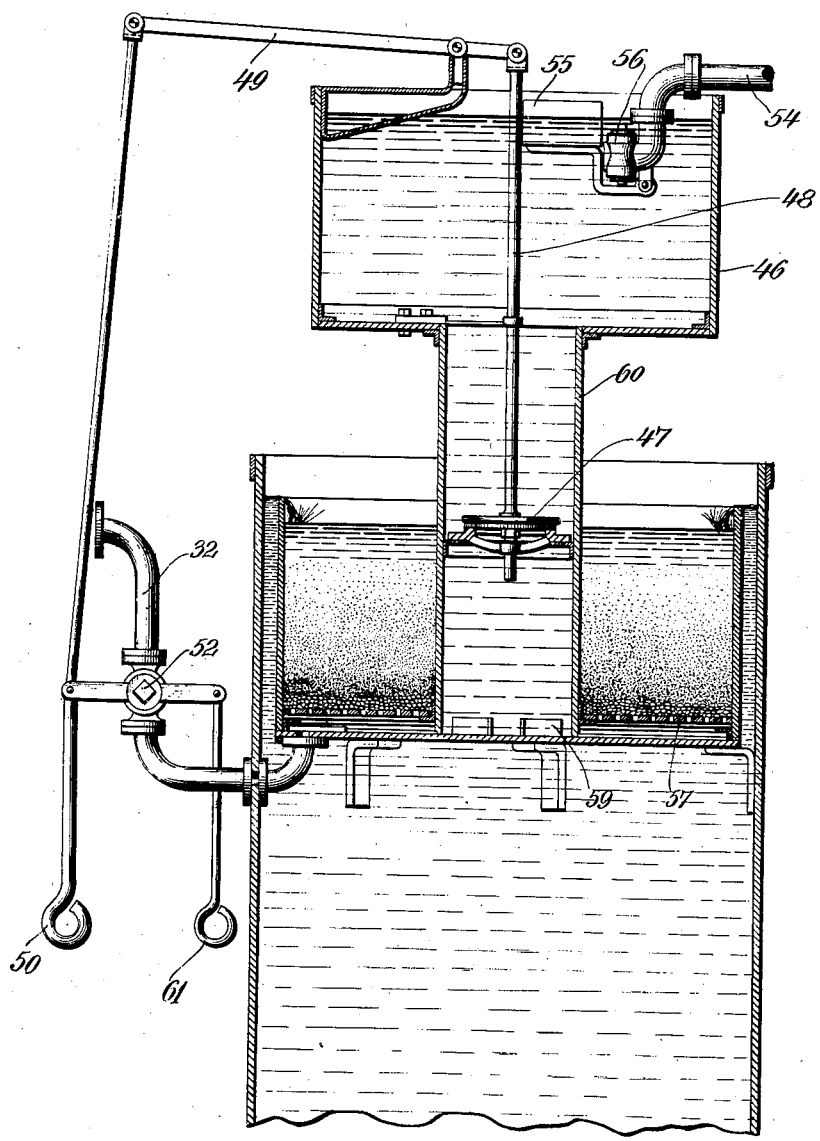

Referring now to the drawings attached to this specification and forming a part thereof, Figure 1 is a vertical cross-section of my improved apparatus that illustrates also one mode in which my process may be carried into effect. Fig. 2 is a detail view of a portion of Fig. 1. Fig. 3 is a view of a part of the siphon mechanism. Fig. 4 is a view of a modification. Fig. 5 is a detail view illustrating the apparatus used to regulate the discharge of the water to the filter. Fig. 6 is a top view of Fig. 5. Fig. 7 illustrates another form of my invention. Fig. 8 is a detail view of the wash-out apparatus shown in Fig. 1. Fig. 9 is a detail view of the wash-out apparatus shown in Fig. 4.

The water to be purified enters the apparatus through the pipe 1 and inlet 2. A valve controlled by a float 3 automatically preserves the level of the water in the tank 4. From the tank 4 the water flows through an adjustable valve 5 into a supply chamber 6.

In the form of the invention illustrated upon the drawings, water is intermittently and impulsively supplied from the supply chamber to the purifying apparatus. I make use of a pipe 7 provided with a bell 8 to intermittently draw off the water from the supply chamber 6 and feed it to the purifying apparatus. The vessel 9 is secured to the pipe 7 by straps 10, the vessel 9 being kept full of water so as to seal the pipe 7 and preventing the direct discharge of water from the pipe 7 into the pipe 11. An air chamber 12 with an air outlet 13 is provided between the siphon and the feed pipe 11. When the level of the water in the supply chamber 6 rises above the upper end of the pipe 7 the siphon 7, 8 starts into action and the water in the supply chamber 6 is rapidly removed therefrom and discharged into the air chamber 12, from which it flows by means of the pipe 11 into the lower portion of the reaction tank 14. By the provision of an intermediate air chamber between the siphon and the feed pipe 11, I avoid dragging air with the feed water into the reaction tank 14. The reaction tank 14 is preferably provided with a conical lower portion 15, and means, such as the supply fuel 16, are used to supply the reaction tank with a reagent that is used to purify the water.

In the best embodiment of my invention I make use of baryta as one of the reagents utilized in the reaction tank and supply the baryta to the tank through the funnel 16. The baryta enters the tank and distributes itself in the form of a powder held in suspension by the water in a plurality of layers through the tank. By reason of the intermittent and impulsive supply of water in the tank through pipe 11, the baryta is stirred and prevented from forming a compact hard body, but is instead kept in the form of a powder distributed throughout the water in the tank. To further insure the stirring of the baryta at the bottom of the tank and to prevent it forming a solid mass that would stop the feed pipe 11, I provide one or more cone shaped deflectors 17 located at the bottom of the tank. The water after passing out of the pipe 11 is sent toward the outside walls of the tank and in consequence thereof the water is caused to circulate in contact with the baryta in eddies between the deflectors and the walls of the tank.

In accordance with my invention, I provide in the reaction tank one or more decanting chambers 18, 19 and 20. I arrange these chambers in such a manner within the tank that they may each be separately supplied with a part of the water to be purified. In the best embodiment of my invention these chambers are arranged one above the other in the tank and the upwardly flowing stream of water coming from the feed pipe 11 will be divided, one portion passing into the decanting chamber 18 through its mouth, another into the decanting chamber 19, and another portion into the uppermost decanting chamber 20. The number of these decanting chambers and their arrangement with respect to the walls of the reaction tank may be widely varied.

In accordance with the apparatus illustrated upon the drawings, I have so arranged the decanting chamber 18 that about one-third of the water to be purified passes through this chamber, and two-thirds of the water to be purified passes between the walls of the decanting chamber 18 and the wall 21 of the reaction tank. This is accomplished by suitably proportioning the cross-sections of the entrance to the decanting chamber and the cross-section for the passage for the water flowing between the decanting chamber and the wall 21 and by regulating the flow of water by means of discharge valves. That portion of the water which passes upwardly through the reaction tank 14, is again sub-divided by the decanting chamber 19 into two streams, one portion of which passes into the decanting chamber 19 and another portion passes into the decanting chamber 20 through the passages between the chamber 19 and the wall 21. The water which passes from the decanting chamber 20 reaches the filter bed 23 through the passages 22. The discharge pipe 24 discharges the water from the decanting chamber 18 to the filter bed and a discharge pipe 25 discharges the water from the chamber 19 to the filter bed 23. Suitable means are provided for regulating the discharge. As shown in Figs. 5 and 6 I have provided the mouth of the pipe 24 with a valve 26 which is pivoted at 27 so that the degree of the opening of the discharge of the pipe 24 may be regulated. The pipe 25 is provided with a pair of plates 28 and 29, provided with slots 30 engaging bolts 31 so that the plates may be separated to vary the degree of the opening of the mouth of the pipe 25 and thus regulate the discharge.

It will be observed that by dividing the upwardly flowing stream of water in the tank 14 into a plurality of streams and by regulating the discharge of one or more of the streams, that the flow or the velocity of the stream may be decreased thus permitting the impurities to settle more readily and so that longer time is thereby given to the water in which to react with the baryta and in which to throw down the impurities. I have found that the specific gravity of the water columns in the reaction tank 14 varies at different points in the tank. The water column below the decanting chamber 20 is the heaviest and has the greatest specific gravity and the water under the decanting chamber 19 has less specific gravity, whereas the water under the decanting chamber 18 has the least specific gravity. By means of the regulating means 26 and 28 I am enabled, however, to adjust the discharge of the water to the right height and degree.

Each stream of water enters its corresponding decanting chamber 18, 19 through a settling basin having a large cross-section, which is cylindrical in the case of the chamber 18, and may be annular as shown in connection with the chamber 19. The upper portion of each of these chambers constitutes a clarifier and narrows in cross-section or tapers. By means of this construction the water to be purified enters slowly into the decanting chambers and the reaction with the baryta occurs slowly and effectively. Clarified water mixed with such impurities as still remain passes up the discharge pipes and over the filter. After leaving the filter, the purified and filtered water passes through the discharge pipe 32 controlled by the cock 33.

Suitable means are provided for washing out the filter bed and for saving that part of the baryta that has been carried to the filter bed. By means of my apparatus, the cleansing of the filter occurs quickly and thoroughly and the mud is removed from the filter with a minimum quantity of wash water, the filtering operation is interrupted for the minimum amount of time and the capacity of the filter is thereby increased. Moreover, by the sudden flow of a large amount of water through the filter bed the entire bed is kept in suspension for a short time and the mud particles can readily free themselves from the material of the filter. In order to accomplish these results, it is desirable to have large passages of ample dimensions, preferably as short as possible, between the storage reservoir and the filter bed, and the passages should be so arranged as to distribute the wash water uniformly throughout the bed and permit quick and impulsive action. It is furthermore desirable to provide an ample escape for the wash water and not to retard the discharge of the wash water by means of narrow passages, which prevent a quick and effective wash-out.

The form of my wash-out apparatus may be varied. In Fig. 1 I have illustrated a wash-out reservoir 34, which communicates with the purified water beneath the filter bed by means of a large wide tube 35. The means for filling the tank, in the form of the invention shown in Fig. 1, comprises a pipe 36 through which flows a stream of water or steam, thus producing a vacuum in the pipe 37. Valve 38 may be used to shut off the stream in the pipe 36. A valve 39 at the top of the tank, when opened, admits air to the tank 34, which breaks the vacuum and the wash-out water descends through the tube 35 upwardly through the filter 23, and discharges over the sides of the filter chamber 40. Any bartya carried over by the wash-out is thereby returned to the decanting reservoir 14. Before discharging the wash water from the filter, it is desirable to make room for it, and to promote a free discharge, by drawing off some of the water in the reaction tank so as to leave a space below the top of the filter chamber 40. For this purpose I make use of a pipe 40ª controlled by a valve 40ᵇ so that when the said valve is opened, water may be drawn from the top of the tank 14 lowering the water level in the tank.

In the form of the invention illustrated in Fig. 2, a partial vacuum is produced in the top of the reservoir 41 by means of steam introduced through pipe 42, the supply of which can be shut off by the stop cock 43, and air valve 44 may be used to admit air to the reservoir and break the vacuum. The steam entering through the pipe 42, will first expel the steam through the stop cock 44, the latter being opened and then after the closing of the stop cocks 44 and 43 the steam will condense and the water will rise in the tank 41. By opening the air valve 44 the water may be discharged with a sudden rush upwardly through the filter bed.

In Fig. 4 instead of using filtered water, I may supply raw wash-out water through the pipe 45. The tank 46 is filled through the pipe 45, and a valve 47 operated by a valve rod 48, lever 49 and hand rod 50, may be used to supply the water to the filter bed during the wash-out operation.

I have illustrated in Fig. 8, in somewhat greater detail, the wash-out apparatus also shown in Fig. 1. As shown in this figure, the filter bed rests upon a grating 51, a great many large, coarse stones 52 forming the bottom of the filter bed, which is surmounted by a layer of sand 53, the purified water escaping through the pipe 32. The wash water contained in reservoir 34 may be suddenly allowed to drop through the tube 35, and thus discharge upwardly through the filter bed. The water in the pipe 36 produces a partial vacuum in the top of the reservoir 34, which is utilized to raise the water into the tank 34 when desired.

In Fig. 9 the form of wash-out apparatus, also shown in Fig. 4, is shown in greater detail. The pipe 54 supplies the wash-out water to the tank 46. The level of the water in the tank is automatically controlled through a float 55 that closes a valve in the valve box 56, and thus shuts the pipe 54 when the water has reached the desired level. The filter bed rests upon the grating 57. Large orifices 59 communicate between the tube 60 and the bottom of the filter bed. Ordinarily the water to be purified passes downwardly through the filter and outwardly through the discharge pipe 32, after it has been purified. A valve 52 is located in said discharge pipe, so that the discharge pipe may be closed during the washing out operation. By means of handles 50 and 61 the valve 52 and valve 47 may be simultaneously operated. The valve 47 will be opened when the valve 52 is closed, and vice versa.

Referring now to Fig. 1, suitable means are provided for supplying lime water to the reaction tank. For this purpose a conical vessel 62 is provided for the purpose of producing a clarified solution of lime water. Raw water enters this vessel from the pipe 63 controlled by the valve 64, the said pipe leading to a long pipe 65 that discharges at the bottom of the vessel. This produces an upwardly flowing stream of water in the vessel 62. Lime water is supplied to the vessel from a tank 66 containing lime, as shown at the bottom of said tank, to which tank water is supplied from the pipe 1 and valve 67. Lime is drawn off through the bottom of the tank 66 through the pipe 68, where it enters the funnel 69 and meets the upwardly flowing stream of water in the tank 62. The clear lime solution is drawn off at 70 through the pipe 71 and discharged at the bottom of the reaction tank. The bottom of the reaction tank may be emptied through a pipe 72 and valve 73.

I have shown in Fig. 7 certain features of my invention applied to a water purifying apparatus in which the decanting chambers are not utilized. In this figure, water to be purified is supplied through the pipe 74 to the tank 75, the inlet being controlled through a float 76 controlling an inlet valve. Branch pipes 77 and 78 lead to the lime mixing tank 79 and lime saturator 80 respectively. Pipe 78 is connected with the pipe 81 which runs to the bottom of the saturator. Lime water is taken from the tank 79 through pipe 82 and funnel 83. The clarified solution of lime water passes out at 84 through pipe 85 to the bottom of the reagent chamber 86. Raw water to be purified enters the tank 87 and is supplied through the siphon 88 having a bell 89 to the air chamber 90. A vessel 91 seals the bottom of the siphon 88. An air escape pipe 92 permits the air in 90 to escape to the atmosphere. The pipe 93 intermittently supplies water to be purified to the bottom of the reaction tank 86, and deflecting plates 94 and 95 spread the water and distribute it through the reagent in the tank so as to mix the reagent solution with the inflowing water. The treated water passes upwardly through the tank 86 and upwardly through the wood shavings filter 96 and out through the pipe 97. A discharge pipe 98 in which is located valve 99, controlled by the rod 100, may be used to withdraw water from the bottom of the filter bed, and thus permit clarified water to pass through the filter bed and wash out the filter. The reaction tank 86 may be discharged through the pipe 101.

Having thus described my invention, what I claim and desire to secure by Letters Patent, is:

1. In an apparatus for purifying water, the combination of a vertical tank, means for maintaining a plurality of layers of baryta in said tank, means for supplying water to be purified to the bottom of said tank, and means for sub-dividing the stream of water supplied to the tank whereby each stream passes through its associated layer.

2. An apparatus for purifying water by means of baryta, comprising in combination a vertical tank, means for supplying water to be purified to the bottom of said tank, means for maintaining a plurality of layers of baryta in said tank, means for sub-dividing the water fed to said tank into a plurality of streams, means for passing each stream through its associated baryta layer, means for discharging each of said streams of water after treatment with baryta, and means for regulating the discharge of one or more of said streams.

3. An apparatus for purifying water by means of baryta, comprising in combination a vertical tank, means for supplying water to be purified to the bottom of said tank, means for maintaining a plurality of layers of baryta in said tank, means for sub-dividing the water fed to said tank into a plurality of streams, means for passing each stream through its associated baryta layer, means for discharging each of said streams of water to a common filter, means for regulating the discharge of one or more of said streams, and means for filtering the water so discharged.

4. In a water purifying apparatus, the combination of a reaction tank, means for supplying a reagent to said tank, a plurality of decanting chambers located within said tank, and means independent of said reagent supplying means for supplying to each of said chambers a part of the water to be purified.

5. In a water purifying apparatus, the combination of a vertical tank, adapted to contain a plurality of layers of a reagent, a plurality of decanting chambers located within said tank, and means for separately supplying to each of said chambers a part of the water to be purified.

6. In a water purifying apparatus, the combination of a reaction tank adapted to contain a suitable reagent, a plurality of decanting chambers located within said tank, one above the other, one or more of said chambers being provided with a settling basin, and a clarifying portion, and means for separately supplying water to be purified to each of said chambers.

7. In a water purifying apparatus, the combination of a reaction tank, means for supplying a suitable reagent to said tank, a plurality of decanting chambers located within said tank, one or more of said chambers being provided with a cylindrical settling basin, and a clarifying portion having a narrowing cross-section, and means for separately supplying a part of the water to be purified to each of said decanting chambers.

8. In a water purifying apparatus, the combination of a reaction tank, means for supplying a suitable reagent to said tank, a plurality of decanting chambers located within said tank, one or more of said chambers being provided with a cylindrical settling basin, and a clarifying portion having a narrowing cross-section, a discharge pipe for one or more of said decanting chambers, and means for supplying a part of the water to be purified to each of said decanting chambers.

9. In a water purifying apparatus, the combination of a reaction tank, means for supplying a suitable reagent to said tank, a plurality of decanting chambers located within said tank, one or more of said chambers being provided with a cylindrical settling basin, and a clarifying portion having a narrowing cross-section, a discharge pipe for one or more of said decanting chambers, means for regulating the discharge of water through said pipe, and means for supplying a part of the water to be purified to each of said decanting chambers.

10. In an apparatus for purifying water, the combination of a reaction tank, a feed pipe, a supply chamber, an air chamber between said supply chamber and said pipe, and means for intermittently supplying the water from said supply chamber to said air chamber.

11. In an apparatus for purifying water, the combination of a reaction tank, a feed pipe, a supply chamber, an air chamber between said supply chamber and said pipe, and a siphon for intermittently supplying the water from said supply chamber to said air chamber.

12. In an apparatus for purifying water, the combination of a reaction tank, a feed pipe, a supply chamber, an air chamber between said supply chamber and said pipe, an air vent for said air chamber, and a siphon for intermittently supplying the water from said supply chamber to said air chamber.

13. In an apparatus for purifying water, the combination of a reaction tank, a reservoir adapted to contain a storage supply of wash-water, a filter inside of said reaction tank and passages of ample dimensions between the reservoir and the filter bed, so arranged as to distribute the wash-water throughout the filter bed, and means for forcing the wash-water through the filter bed by a quick impulsive action.

14. In an apparatus for purifying water, the combination of a reaction tank, a filter bed inside of said reaction tank, a reservoir for supplying wash-water for washing out the filter, passages of ample dimensions between the reservoir and the filter bed so arranged as to distribute the wash-water uniformly throughout the bed, means for supplying wash-water throughout the filter bed by a quick impulsive action, and means for directing the wash-water in the reverse direction through the filter bed from that taken by the water in the filtering operation.

15. In a water purifying apparatus, the combination of a reaction tank, a filter bed inside of said reaction tank, a reservoir adapted to contain wash-water located above said filter bed, passages of ample dimensions between the reservoir and filter bed so arranged as to distribute wash-water uniformly throughout the bed, passages of ample cross-section to deliver the water from the filter bed without retarding the flow of the wash-out water, and means for supplying filtered water to said reservoir.

16. In a water purifying apparatus, the combination of a reaction tank, a filter bed inside of said reaction tank, a reservoir adapted to contain wash-water located above said filter bed, passages of ample dimensions between the reservoir and filter bed so arranged as to distribute wash-water uniformly throughout the bed, passages of ample cross-section to deliver the water from the filter bed without retarding the flow of the wash-out water, and means for producing a partial vacuum in said reservoir so as to draw a supply of filtered water into said reservoir from said filter bed.

17. In a water purifying apparatus, the combination of a reaction tank, means for supplying a reagent to said tank, a plurality of decanting chambers each provided with an open mouth and each located within said tank, and means independent of said reagent supplying means for supplying to each of said decanting chambers a part only of the raw water which enters the reaction tank.

18. In a water purifying apparatus, the combination of a vertical tank adapted to contain a plurality of layers of a reagent, a plurality of open mouthed decanting chambers located within said tank, one or more of said chambers being so arranged with respect to the walls of the reaction tank as to permit the passage of water between the chamber and the tank, and means for separately supplying to each of said chambers a part only of the raw water which enters the reaction tank.

19. In a water purifying apparatus, the combination of a reaction tank, a reservoir adapted to contain a storage supply of wash-water, a filter, passages of ample dimensions between the reservoir and the filter bed so arranged as to distribute the wash water through the filter bed, means for forcing the wash-water through the filter bed by a quick impulsive action, said filter bed being arranged inside of said reaction tank and adapted to receive water from the reaction tank during the filtering operation and to discharge water into the reaction tank while the wash-water is being forced through the filter bed.

20. In a water purifying apparatus, the combination of a reaction tank, a reservoir adapted to contain a storage supply of wash-water, a filter bed, passages of ample dimensions between the reservoir and the filter bed, passages between the filter bed and the walls of the reaction tank, means for forcing wash-water through the filter bed by a quick impulsive action, the parts being so arranged that water may be discharged from the reaction tank into the filter bed during the filtering operation and the wash-water may be discharged from the filter bed into the reaction tank during the washing operation.

In testimony whereof, I have signed my name to this specification, in the presence of two subscribing witnesses.

HANS REISERT.

Witnesses:
LOUIS VANDORN,
EUGEN KREUTZBERG.